(12) United States Patent
Tønnessen et al.

(10) Patent No.: US 7,270,214 B1
(45) Date of Patent: Sep. 18, 2007

(54) METHOD AND APPARATUS FOR REDUCING AND EXTRACTING WING-TIP VORTEX ENERGY

(75) Inventors: Rune Tønnessen, Oslo (NO); Stephane Cordier, Rouen (FR); Eskild Storteig, Lierskogen (NO)

(73) Assignee: WesternGeco L.L.C., Houston, TX (US)

( * ) Notice: Subject to any disclaimer, the term of this patent is extended or adjusted under 35 U.S.C. 154(b) by 236 days.

(21) Appl. No.: 10/869,465

(22) Filed: Jun. 16, 2004
(Under 37 CFR 1.47)

(51) Int. Cl.
*G01V 1/00* (2006.01)

(52) U.S. Cl. .................. 181/110; 114/274; 114/244; 181/115; 367/20

(58) Field of Classification Search ........... 244/198, 244/199.1, 199.2, 199.3, 199.4, 206; 367/2–11, 367/20; 114/39.24, 274, 244; 181/110, 115
See application file for complete search history.

(56) References Cited

U.S. PATENT DOCUMENTS

| | | | | |
|---|---|---|---|---|
| 2,623,938 A | * | 12/1952 | Thomas | 367/185 |
| 3,997,132 A | * | 12/1976 | Erwin | 244/199.3 |
| 4,190,012 A | * | 2/1980 | Rispin et al. | 114/243 |
| 4,300,218 A | * | 11/1981 | Kruka et al. | 367/165 |
| 4,396,088 A | * | 8/1983 | Bayhi | 181/120 |
| 4,917,332 A | * | 4/1990 | Patterson, Jr. | 244/58 |
| 4,993,977 A | * | 2/1991 | Rodler, Jr. | 440/67 |
| 5,113,377 A | * | 5/1992 | Johnson | 367/20 |
| 5,150,859 A | * | 9/1992 | Ransick | 244/58 |
| 5,309,946 A | | 5/1994 | Ligneul | 138/39 |
| 5,702,071 A | * | 12/1997 | Kroll et al. | 244/199.3 |
| 5,795,200 A | * | 8/1998 | Larkin | 440/81 |
| 5,856,954 A | * | 1/1999 | Grall | 367/106 |
| 5,918,835 A | * | 7/1999 | Gerhardt | 244/199.3 |
| 5,934,612 A | * | 8/1999 | Gerhardt | 244/58 |
| 6,982,926 B2 | * | 1/2006 | Tenghamn et al. | 367/20 |
| 2002/0062777 A1 | * | 5/2002 | Barker | 114/243 |
| 2002/0158472 A1 | * | 10/2002 | Robson | 290/43 |

FOREIGN PATENT DOCUMENTS

| WO | WO 00/01580 | 1/2000 |
|---|---|---|
| WO | WO 00/18641 | 4/2000 |
| WO | WO 02/083497 A1 | 10/2002 |

\* cited by examiner

*Primary Examiner*—Michael J. Carone
*Assistant Examiner*—Benjamin P. Lee
(74) *Attorney, Agent, or Firm*—Pramudji Wendt & Tran LLC; L. Mark Ye; Jeffrey E. Griffin

(57) ABSTRACT

The present invention provides an apparatus and a method for reducing wing-tip vortex energy during seismic exploration. The apparatus includes a vortex concentrator of deployed proximate a tip of a hydrofoil and a vortex reducing device deployed proximate the vortex concentrator.

33 Claims, 6 Drawing Sheets

METHOD AND APPARATUS FOR REDUCING AND EXTRACTING WING-TIP VORTEX ENERGY

BACKGROUND OF THE INVENTION

1. Field of the Invention

This invention relates generally to seismic exploration, and, more particularly, to reducing and extracting wing-tip vortex energy during seismic exploration.

2. Description of the Related Art

Marine seismic exploration is widely used to locate and/or survey subterranean geological formations for hydrocarbon deposit because many hydrocarbon deposits are found beneath bodies of water. FIG. 1 conceptually illustrates a conventional system 100 for carrying out a marine seismic survey. The conventional system 100 includes a survey vessel 105 coupled to a seismic array 110, which typically include one or more streamers 120. One or more seismic sensors 125, such as hydrophones, may be distributed along the length of the seismic streamer 120. Although not shown in FIG. 1, one or more seismic sources may also be included within the conventional system 100.

In operation, the survey vessel 105 tows the seismic array 110 along a predetermined path. One or more seismic sources (not shown) may be used to drive an acoustic wave, commonly referred to as a "shot," through the overlying water and into the ground. The acoustic wave may be reflected by subterranean geologic formations and propagate back to the seismic sensors 125. The seismic sensors 125 receive the reflected waves, which are then processed to generate seismic data. Analysis of the seismic data may indicate probable locations of geological formations such as hydrocarbon deposits.

The accuracy of the seismic survey is determined, in part, by how accurately the seismic array 110 is towed along the predetermined path, indicated by the arrow 112. Thus, in addition to guiding the seismic array 110 by steering the survey vessel 105, one or more deflector devices 135 are typically coupled to the seismic array 110. The deflector devices 135 are typically used to maintain a spread of the streamers 120 of the seismic array 110 and to steer the path of the seismic array 110 so that it approximately coincides with the predetermined path 112.

One or more hydrofoils 135 are typically used as the deflector devices 135 attached the seismic array 110. The hydrofoils 135 provide lift as they are towed through the water by the survey vessel 105. For example, a hydrofoil 135 used as a deflector device in a seismic survey has a lift of several tons. The lift provided by the hydrofoils 135 is used to maintain a spread of the streamers 120 of the seismic array 110 and/or to steer the path of the seismic array 110. However, the ability of the hydrofoils 135 to maintain the spread of the streamers 120 and/or to steer the seismic array 110 is limited by the electrical power available to the hydrofoil 135. Towed generators (not shown) may be towed by the streamers 120, but these typically only provide a small amount of electrical power while significantly increasing the drag of the streamers 120.

FIG. 2 conceptually illustrates an exemplary embodiment of a conventional hydrofoil 200. The hydrofoil 200 may generate tip vortices 210 near one or more tips 205 of the hydrofoil 200 as the hydrofoil 200 is towed through the water in a direction indicated by the arrow 212. Persons of ordinary skill in the art should appreciate that the path of the fluid flow in the tip vortices 210 typically has a spiral shape, i.e. the fluid flows along a three-dimensional approximately cork-screw-like path, although the tip vortices 210 are conceptually illustrated in FIG. 2 by approximately sinusoidal lines. The tip vortices 210 are regions of highly rotational fluid that trail the tips 205 of the hydrofoil 200. The rotational strength of the tip vortices 210 is approximately proportional to the lift generated by the hydrofoil 200. The tip vortices 210 may have many undesirable consequences for the marine seismic survey. For example, the tip vortices 210 may interfere with objects located in the wake of the hydrofoil 200, such as the seismic streamers 120, the seismic sensors 125, and the like, potentially increasing the noise that may be received on the seismic sensors 125. For another example, the tip vortices 210 may cause one or more of the seismic streamers 120 to oscillate undesirably. The tip vortices 210 may also reduce the lift and increase the drag of the hydrofoil 200. For example, if the hydrofoil 200 has a lift of about ten tons and a lift-to-drag ratio of about five, the drag of the hydrofoil 200 would be about two tons, most of which is related to the energy that goes into the tip vortices 210.

A number of techniques for reducing the undesirable interaction between the conventional hydrofoil 200 and the tip vortex have been proposed. Cordier, et al (International Patent Publication Number WO 00/18641) has described a technique of placing serrated plates on a free edge of a hydrofoil for breaking a tip vortex generated near the free edges of the hydrofoil. Various devices for rectifying flow of a turbulent fluid have also been proposed. For example, a flow rectifier that may be mounted in a duct along which a fluid is flowing has been described by Ligneul (U.S. Pat. No. 5,309,946).

The conventional hydrofoil 200 may also include a rotational body 220, also called a torpedo body, positioned near one or more tips 205 of the hydrofoil 200. For example, the rotational body 220 may be included to increase the buoyancy of the hydrofoil 200. However, the rotational body 220 may also be an effective concentrator of a tip vortex 225, which may result in the tip vortex 225 having a higher rotational velocity than the tip vortex 210. Consequently, the presence of the rotational body 220 may lead to higher downstream disturbances caused by the tip vortex 225.

The present invention is intended to address one or more of the problems discussed above.

SUMMARY OF THE INVENTION

In one embodiment of the instant invention, an apparatus is provided for reducing rotational energy of a wing-tip vortex during seismic exploration. The apparatus includes a vortex concentrator of deployed proximate a tip of a hydrofoil and a vortex reducing device deployed proximate the vortex concentrator.

In another embodiment of the instant invention, a method is provided for reducing wing-tip vortex energy during seismic exploration. The method includes concentrating at least one vortex proximate at least one tip of a hydrofoil and reducing a rotational velocity of the at least one concentrated vortex.

In yet another embodiment of the instant invention, an apparatus is provided for extracting rotational energy from a wing-tip vortex during seismic exploration. The apparatus includes a vortex concentrator of deployed proximate a tip of a hydrofoil and a propeller deployed proximate the vortex concentrator such that the propeller acts to reduce a rotational velocity of vortices proximate the tip of the hydrofoil.

In one embodiment, the apparatus may include a generator to convert the extracted rotational energy into electrical power.

BRIEF DESCRIPTION OF THE DRAWINGS

The invention may be understood by reference to the following description taken in conjunction with the accompanying drawings, in which like reference numerals identify like elements, and in which.

Figure 2:
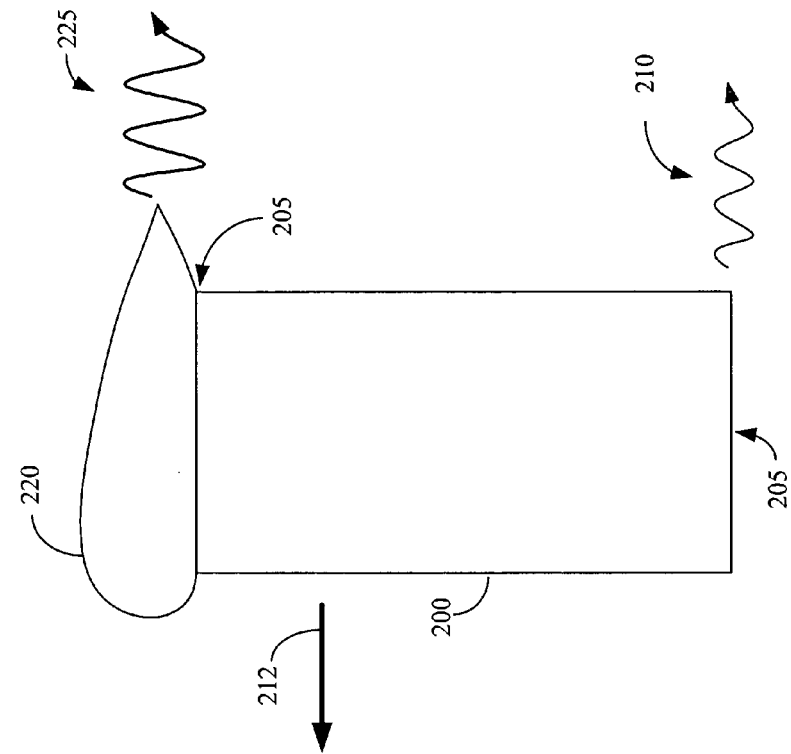
FIG. 2 conceptually illustrates an exemplary embodiment of a conventional hydrofoil that may be used in the prior art seismic surveying system shown in FIG. 1.
Figure 1:
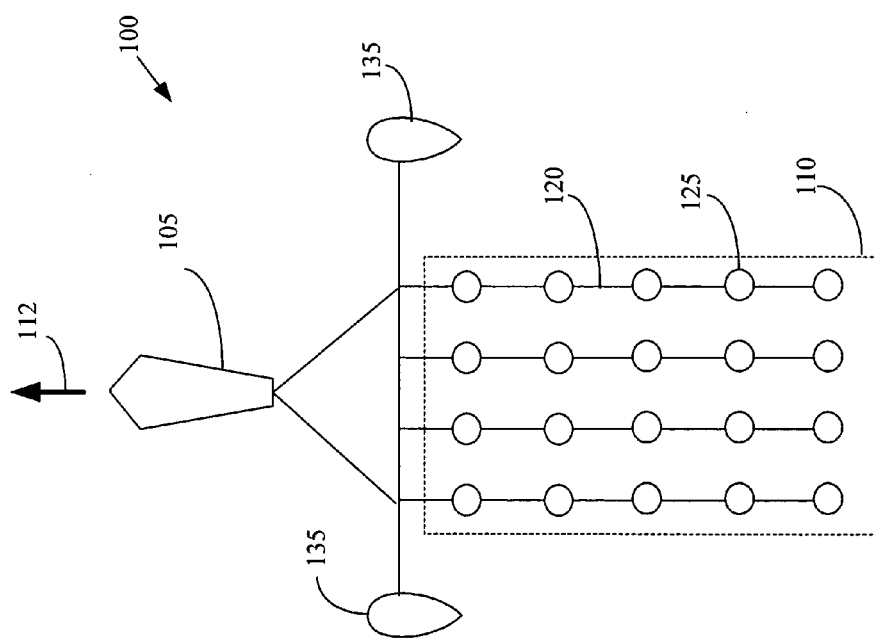
FIG. 1 conceptually illustrates a prior art system for carrying out a marine seismic survey.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
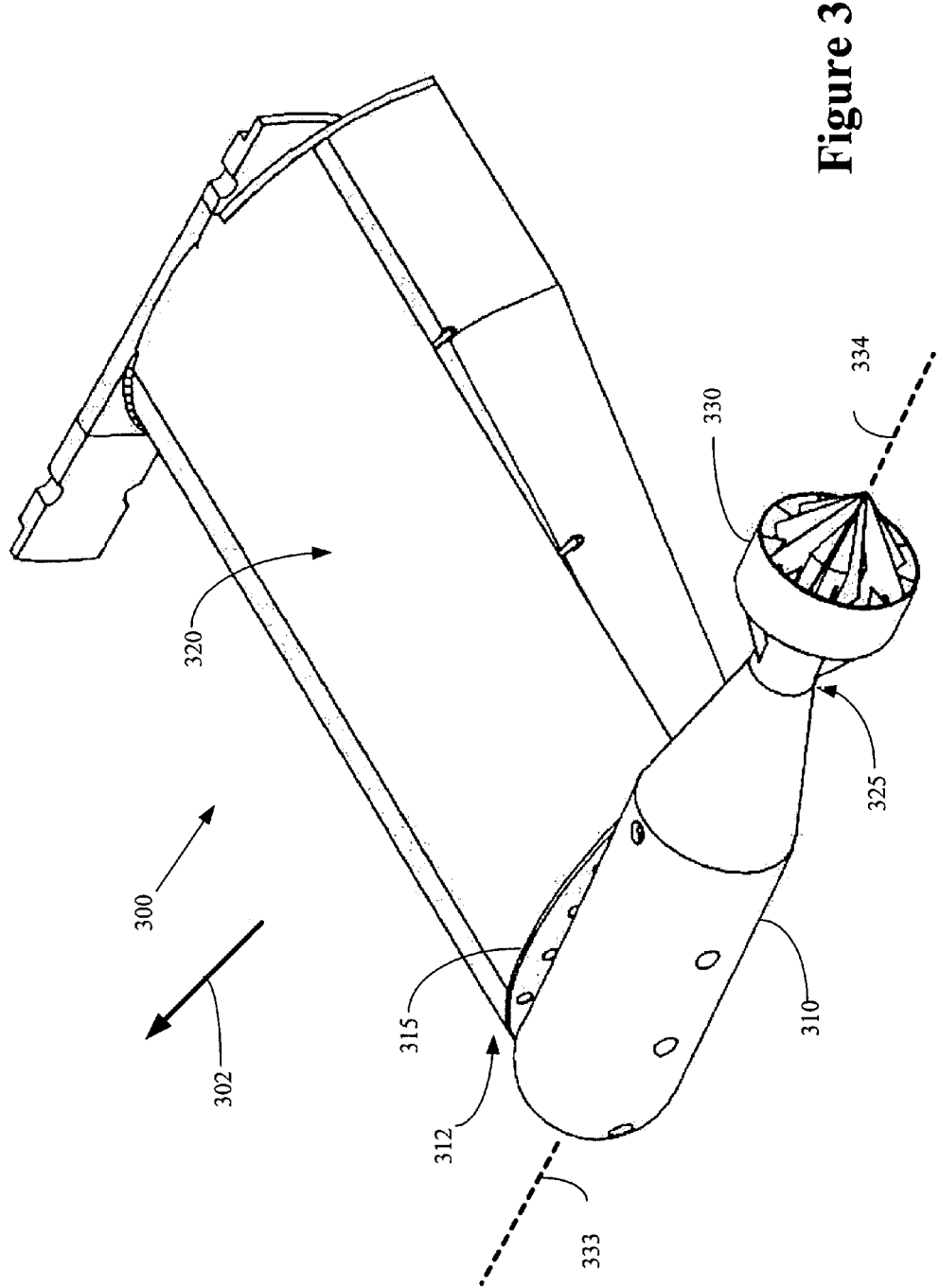
FIG. 3 conceptually illustrates one embodiment of a hydrofoil, in accordance with the present invention.

FIG. 3 conceptually illustrates one embodiment of a hydrofoil 300. In the illustrated embodiment, only half a wing, such as may be used in experimental studies of the operation of the hydrofoil 300, is shown. In practice, a full wing formed of two half-wings, such as the hydrofoil 300, may be used. The hydrofoil 300 may be employed in systems intended for use in aquatic environments, i.e., fresh, salt, or brackish water, such as marine seismic survey systems. As will be appreciated by those skilled in the art, such surveys are frequently referred to as "marine surveys" even if performed in fresh or brackish waters. The term is so used herein. In operation, the hydrofoil 300 is towed through the water approximately along a direction indicated by the arrow 302.

A rotational body 310 is deployed proximate a tip 312 of the hydrofoil 300. In one embodiment, the rotational body 310 is a torpedo body that is physically coupled to a cradle 315 deployed at the tip 312 the hydrofoil 300. The cradle 315 may permit a smooth transition of fluid flow from the hydrofoil 300 to the rotational body 310. In operation, the hydrofoil 300 moves through a fluid, such as seawater, and generates a lift that is approximately perpendicular to a surface 320 of the hydrofoil 300. As the hydrofoil 300 moves through the fluid, tip vortices may form proximate the tip 312 of the hydrofoil 300. The rotational body 310 concentrates the tip vortices, thereby tending to increase the rotational velocity of the fluid in the tip vortices as the tip vortices are shed by the tip 312 of the hydrofoil 300. In one embodiment, the energy of the tip vortices is well concentrated near a trailing end 325 of the rotational body 310 and the tip vortices leave the rotational body 310 near the trailing end 325. Thus, the rotational body 310 acts as a "vortex concentrator," i.e. it concentrates the tip vortices near the trailing end 325 of the rotational body 310.

A vortex reducing device 330, sometimes also referred to as a vortex killing device, is deployed near the trailing end 325 of the rotational body 310. In operation, the vortex reducing device 330 is deployed substantially within the wake of the rotational body 310. As should be appreciated by persons of ordinary skill in the art, the term "substantially within the wake" is intended to reflect the fact that the boundaries of the wake may depend on factors such as the velocity and/or direction of currents in the fluid, the angle and/or velocity of the hydrofoil 300, and the like. Thus, the boundaries of the wake may not be well-defined. Moreover, depending on the shape of the wake, only a portion of the vortex reducing device 330 may be coincident with a portion of the wake.

In one embodiment, the rotational body 310 is cylindrically symmetric about an axis 333. The vortex reducing device 330 may also be cylindrically symmetric about an axis 334. However, persons of ordinary skill in the art should appreciate that, in alternative embodiments, the rotational body 310 and/or the vortex reducing device 330 may not be cylindrically symmetric and, if they are, they may not be coaxial. In operation, the vortex reducing device 330 that is deployed coaxial with the rotational body 310 may also be deployed substantially within the wake of the rotational body 310.

In one embodiment, the vortex reducing device 330 may be deployed coaxially, i.e. so that the axes 333, 334 coincide, with the rotational body 310. However, the present invention is not limited to embodiments in which the axes 333, 334 coincide. For example, it is known that the direction of travel of tip vortices formed proximate the tip 312 of the hydrofoil 300 may not precisely follow the axis 333, but rather may travel in a direction towards a centre of the hydrofoil 300. Accordingly, in some alternative embodiments, the axis 334 may point slightly inwards. Moreover, in alternative embodiments, an aft part of the rotational body 310 may also point inwards.

By deploying the vortex reducing device 330 proximate the trailing edge 325 of the rotational body 310, the vortex reducing device 330 is configured to reduce the rotational velocity of the tip vortices shed by, and concentrated by, the rotational body 310. As will be discussed in detail below, action of the vortex reducing device 330 on the fluid flow may convert large tip vortices into smaller, contra-rotating vortices, which may increase diffusion of the tip vortices and thereby may reduce the rotational velocity of the tip vortices to approximately 25% to 30% of the rotational velocity of the vortices that would likely be present in the absence of the vortex reducing device 330.

Figure 4A:
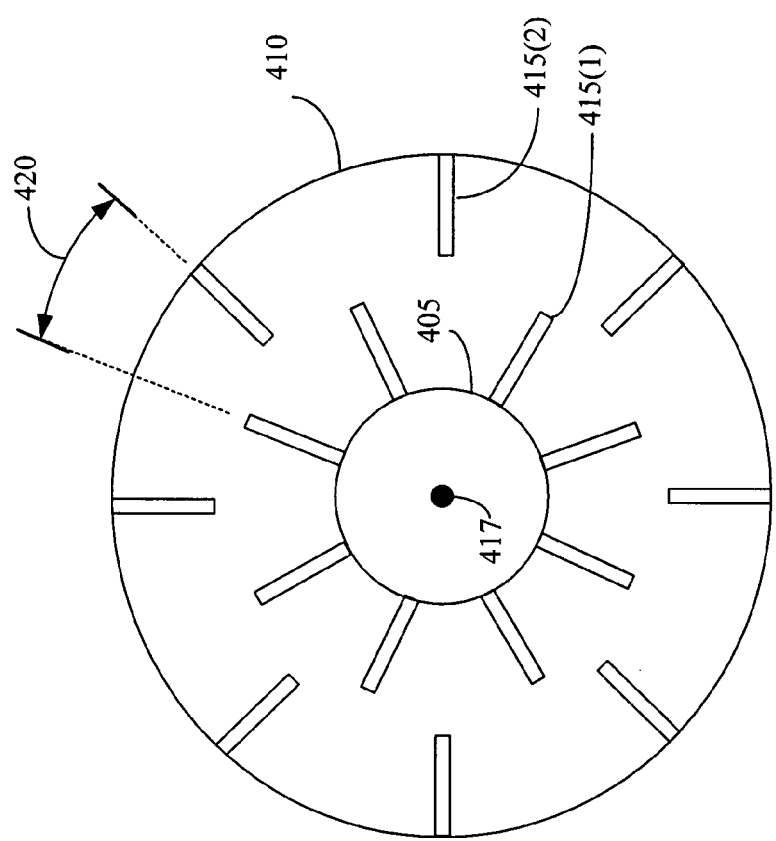
FIG. 4A conceptually illustrates a frontal view of a first embodiment of a vortex reducing device that may be used with the hydrofoil shown in FIG. 3.

FIG. 4A conceptually illustrates a frontal plan view of a first embodiment of a vortex reducing device 400. In the illustrated embodiment, the vortex reducing device 400 includes a hub 405, a duct 410, and at least one pair of ribs 415(1-2). The hub 405 may be a cylindrical elongation of the rotational body 310 shown in FIG. 3. However, in alternative embodiments, the hub 405 may also be a separate element that may be mounted on the rotational body 310 shown in FIG. 3. The duct 410 encloses the hub 405. In one embodiment, the duct 410 is cylindrical and deployed approximately coaxial with an axis 417 of the hub 405. However, in alternative embodiments, any desirable shape may be used for the duct 410.

The rib pairs 415(1-2) are deployed such that a first rib 415(1) is coupled to the hub 405 and a second rib 415(1) is coupled to the duct 410. In the illustrated embodiment, each pairs of ribs 415(1-2) are deployed in the vortex reducing device 400. However, persons of ordinary skill in the art will appreciate that other numbers of rib pairs 415(1-2) may be used in the present invention. In one alternative embodiment, three rib pairs 415(1-2) may be deployed in order to connect the duct 410 to the hub 405. In another alternative embodiment, more than eight rib pairs 415(1-2) may be deployed in the vortex reducing device 400. However, persons of ordinary skill in the art having benefit of the present disclosure should appreciate that increasing the number of rib pairs 415(1-2) substantially beyond eight may reduce the effectiveness of the vortex reducing device 400 because of interference between the rib pairs 415(1-2). Although not shown in FIG. 4A, at least three of the ribs 415(1-2) also include a portion that couples the hub 405 and the duct 410. Also, in one embodiment, the ends of the rib pairs 415(1-2) overlap, as shown in FIG. 4A.

In one embodiment, the rib pairs 415(1-2) are deployed such that the first and second ribs 415(1-2) are not radially aligned. For example, the rib pairs 415(1-2) shown in FIG. 4A are spread equidistantly about an outer circumference of the hub 405 and an inner circumference of the duct 410, and are therefore displaced from each other by an angle 420 of approximately 22.50. However, persons of ordinary skill in the art should appreciate that the displacement angle 420 may vary, particularly if more or fewer rib pairs 415(1-2) are used, and that the displacement angle 420 may not be a constant throughout the vortex reduction device 400 if the rib pairs 415(1-2) are not spread equidistantly about the outer circumference of the hub 405 and/or the inner circumference of the duct 410. The angular displacement of the rib pairs 415(1-2) may reduce the destructive interaction between the rib pairs 415(1-2) and thereby enhance the reduction in the rotational velocity of the tip vortices.

Ribs and/or rib pairs 415(1-2) may "shadow" each other, i.e. one rib or rib pair 415(1-2) may be partially, or entirely, in the wake of another rib or rib pair 415(1-2). Shadowing may reduce the effectiveness of the vortex reducing device 400. Accordingly, in one embodiment, each of the rib pairs 415(1-2) may be deployed so that none of the rib pairs 415(1-2) shadows another rib pair 415(1-2) as fluid flows past the rib pairs 415(1-2). Alternatively, each of the rib pairs 415(1-2) may be deployed so that none of the individual ribs 415(1-2) shadows another rib 415(1-2) as fluid flows past the rib pairs 415(1-2). However, persons of ordinary skill in the art should appreciate that the ribs and the rib pairs 415(1-2) will virtually always shadow each other, if only to a very small extent. Thus, it should be understood that the phrase "does not shadow" allows for a small amount of shadowing that may not have a large effect on the operation of the vortex reducing device 400, when considered in the operational context of the vortex reducing device 400 by a person of ordinary skill in the art.

Figure 4B:
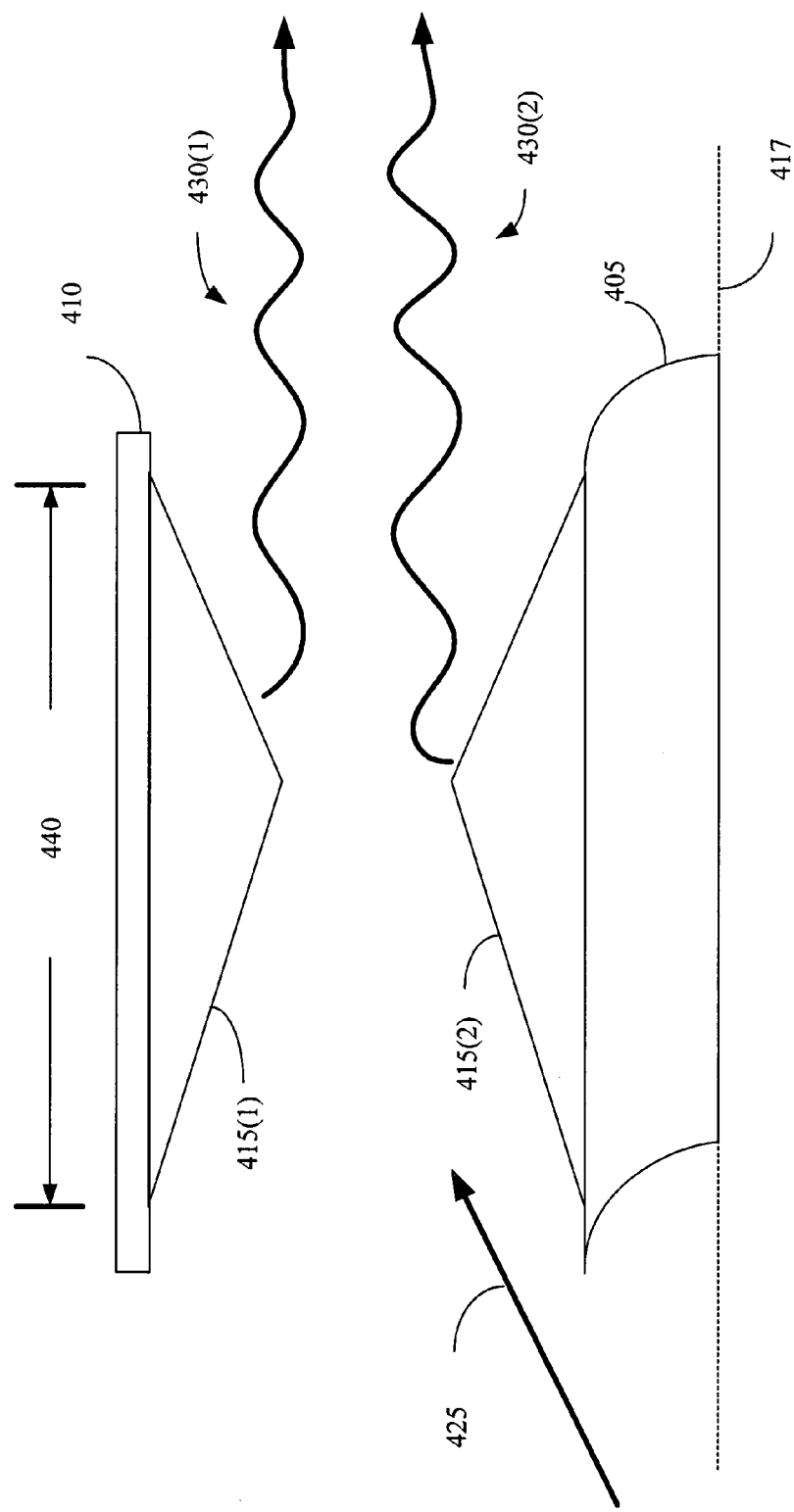
FIG. 4B conceptually illustrates a cross-sectional view of a first embodiment of a vortex reducing device that may be used with the hydrofoil shown in FIG. 3.

FIG. 4B conceptually illustrates a cross sectional view of a top half (above an axis 417) of the first embodiment of the vortex reducing device 400. Tip vortices that are concentrated by a rotational body 402 result in fluid entering the vortex reducing device 400 along a direction indicated by arrow 425. In one embodiment, the fluid enters the vortex reducing device 400 at an angle of approximately 45° from the axis 417 of the hub 405 of the vortex reducing device 400. The direction 425 of the fluid flow comprises an inline portion 427 and a rotational portion 428. Thus, although the arrow 425 appears to lie in the plane of FIG. 4B, persons of ordinary skill in the art should appreciate that the arrow 425 typically points either into or out of the plane of FIG. 4B.

When the fluid passes through the duct 410 and past the rib pairs 415(1-2), a vortex pair having two contra-rotating vortices 430(1-2) is formed. Although the tip vortices 430(1-2) are conceptually illustrated in FIG. 4 by two-dimensional, approximately sinusoidal lines, persons of ordinary skill in the art should appreciate that the path of the fluid flow in the tip vortices 430(1-2) typically has a spiral shape, i.e. the fluid flows along a three-dimensional, approximately cork-screw-like path. For example, the vortex 430(1) may be rotating in a right-handed direction and the vortex 430(2) may be rotating in a left-handed direction. The influence of the two contra-rotating vortices 430(1-2) on each other causes the vortex pair 430(1-2) to travel away from a kernel of the tip vortex and helps diffuse the kernel. Consequently, rotational energy of the vortex pair 430(1-2) may be transformed into fluid friction and thereby heat.

In the illustrated embodiment, the rib pairs 415(1-2) are triangular. For example, the rib pairs 415(1-2) may each be similar to one half of the so-called delta wing that is used on airfoils. Delta-wings are known to be efficient in creating vortices at incident angles of about 45°. However, persons of ordinary skill in the art will appreciate that the present invention is not limited to triangular rib pairs 415(1-2). In alternative embodiments, the rib pairs 415(1-2) may have any desirable shape. A length 440 of the rib pairs 415(1-2) may also be selected to rectify the flow.

Referring again to FIG. 4A, the vortex reduction device 400 may be designed to reduce vibrations and thereby reduce noise that may be introduced into the seismic frequency band by the vortex reduction device 400. In one embodiment, the hub 405, the duct 410, and/or the rib pairs 415(1-2) may be formed of a lightweight material having a high stiffness-to-weight ratio, such as carbon fiber or a carbon fiber composite, thereby allowing for a stiff and light design that has eigenfrequencies substantially above the seismic frequency band of interest in the marine seismic survey. In one embodiment, the rib pairs 415(1-2) may be formed with sharp trailing edges (not shown) so as to suppress vortex shedding that may cause the rib pairs 415(1-2) to vibrate.

Figure 5B:
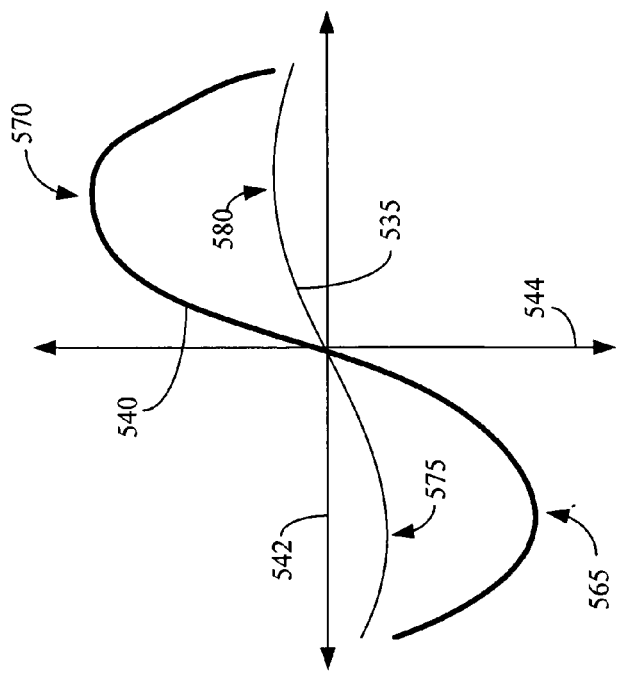
FIG. 5B conceptually illustrates rotational velocities of the tip vortices shown in FIG. 5A.
Figure 5A:
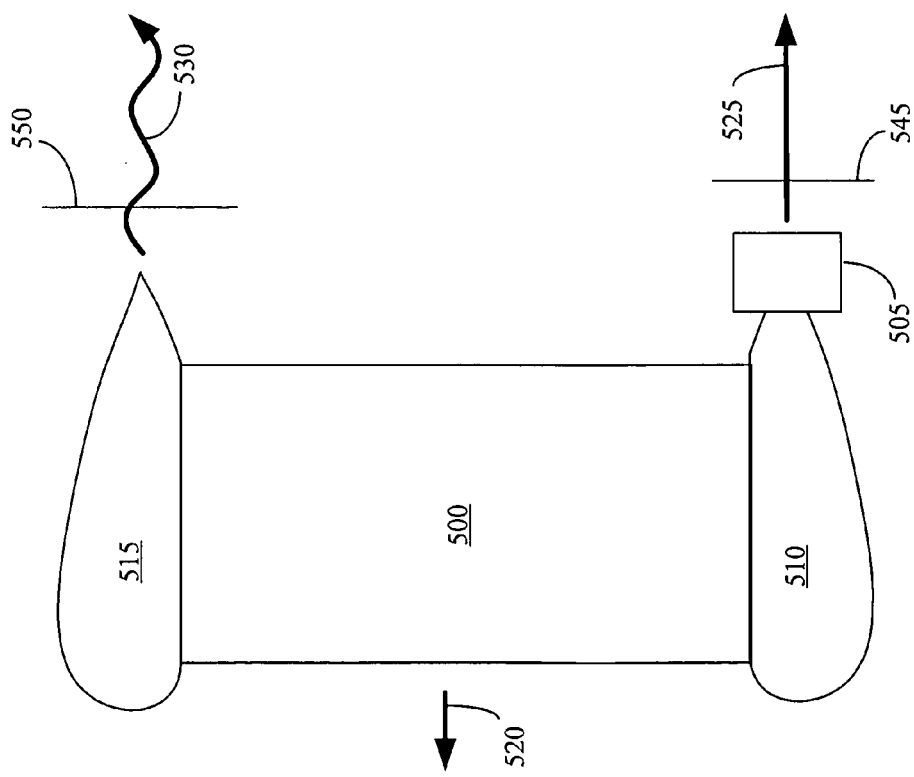
FIG. 5A conceptually illustrates tip vortices shed by a hydrofoil with and without a vortex reduction device.

FIG. 5A conceptually illustrates a hydrofoil 500 wherein a vortex reduction device 505 is deployed proximate a trailing end of a rotational body 510 and no vortex reduction device is deployed near a rotational body 515. Persons of ordinary skill in the art should appreciate that this particular arrangement is selected for illustrative purposes and is not intended to limit the present invention. As the hydrofoil 500 travels through the water along a direction indicated by arrow 520, tip vortices 525, 530 are shed by the rotational bodies 510, 515, respectively, as discussed above.

FIG. 5B conceptually illustrates rotational velocities 535, 540 of the tip vortices 525, 530, respectively. Axis 542 corresponds to radius from an axis of the rotational body 510, 515 and axis 544 corresponds to the amplitude of the measured rotational velocity. In the illustrated embodiment, the rotational velocities 535, 540 are measured in planes 545, 550, respectively, as shown in FIG. 5A. As shown in FIG. 5B, the measured rotational velocity 540 is approximately zero upon the axis of the rotational body 515 and rises to negative and positive peaks 565, 570 as the radius from the axis of the rotational body 515 increases. After the negative and positive peaks 565, 570, the measured velocity 540 then falls with increasing radius from the axis of the rotational body 515.

Deploying the velocity reducing device 505 proximate the trailing end of the rotational body 510 reduces the rotational velocity 535 of the vortex 525. In the illustrated embodiment, the amplitude of the negative and positive peaks 575, 580 of the rotational velocity 535 is reduced to approximately 25% to 30% of the amplitude of the negative and positive peaks 565, 570 of the rotational velocity 540. However, persons of ordinary skill in the art should appreciate that the reduction in the peaks of the rotational velocity may depend on a variety of factors, such as the design of the vortex reduction device 505, the shape of the rotational body 510, 515 as well as other factors such as the ambient temperature, density, and/or velocity of the fluid. In one embodiment, the vortex reduction device 400 may be configured such that one or more peaks 565, 570, 575, 580 of the rotational velocity 535, 540 are approximately within the duct 410.

Figure 6:
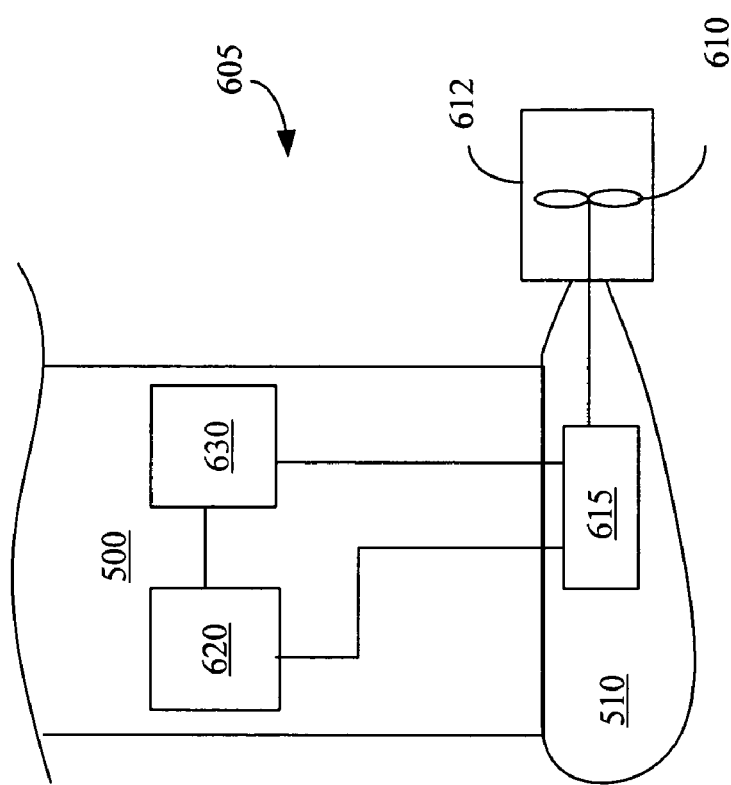
FIG. 6 conceptually illustrates a second embodiment of the vortex reduction device.

FIG. 6 conceptually illustrates a second embodiment of the vortex reducing device 600 that may be deployed on a lower, or upper, portion 605 of the hydrofoil 500. The vortex reducing device 600 may also be referred to as a vortex reducing turbine. In the illustrated embodiment, a propeller 610 deployed within a duct 612 acts as a vortex reduction device. In one embodiment, the propeller 610 is formed and/or deployed such that one or more eigenfrequencies of the propeller 610 are substantially outside a seismic band. For example, the propeller 610 may be formed of carbon fiber. In operation, tip vortices, i.e. a highly rotational fluid flow, are formed by the hydrofoil 500, concentrated by the rotational body 510, and impinge on the propeller 610. The rotational energy of the tip vortices causes the propeller 610 to rotate, thereby extracting rotational energy from the flow and reducing the rotational energy in the tip vortices.

The energy extraction efficiency of the vortex reduction device 600 depends, at least in part, on the design of the propeller 610. In one embodiment, the propeller 610 is designed based upon an expected inflow angle of a fluid flow that includes a linear portion (e.g. a jet) and a highly rotational portion (e.g. a tip vortex). For example, in contrast to a conventional ship propeller that introduces energy and vortices into a fluid as the fluid flows past the ship propeller, the propeller 610 may be designed to extract energy from the fluid, while at the same time reducing the drag of the hydrofoil 605, by reducing the rotational energy of tip vortices as the fluid flows past the propeller 610. By accounting for the characteristics of the expected inflow, the efficiency of the propeller 610, as well as the hydrofoil 605, may be increased. For example, the propeller 610 can potentially extract several kilowatts, which is considerably more than can be extracted using a similar sized propeller operating in free stream.

The propeller 610 shown in FIG. 6 is rotationally coupled to a generator 615. Thus, the rotational power of the propeller 610 may be converted into electrical power by the generator 615. In one embodiment, the generator 615 is electrically coupled to a control system including one or more instruments 620 deployed in the hydrofoil 500. In operation, the generator 615 may provide electrical power to the one or more instruments 620 or actuators (not shown). Alternatively, the generator 615 may be electrically coupled to a battery 630, which may store electrical power provided by the generator 615 and may provide the stored electrical power to the one or more instruments 620 or actuators (not shown).

Although only one propeller 610 and generator 615 are shown in FIG. 6, persons of ordinary skill in the art should appreciate that the present invention is not limited to one propeller 610 and one generator 615. In alternative embodiments, additional propellers 610 and/or generators 615 may be deployed on the hydrofoil 500. For example, a second rotational body 510 having a propeller 610 and a generator 615 may be deployed on the upper half (not shown) of the hydrofoil 500.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   a marine seismic streamer;
   a hydrofoil operatively connected to the streamer;
   a vortex concentrator deployed proximate a tip of the hydrofoil; and
   a vortex reducing device deployed substantially in the wake of the vortex concentrator thus reducing noise in sensors contained in the streamer, the vortex reducing device selected from
   a) a device comprising a hub, a duct and at least one pair of ribs, wherein one of the pair of ribs is coupled to the hub and one of the pair of ribs is coupled to the duct; and
   b) a propeller.

2. The apparatus of claim 1, wherein the vortex concentrator comprises a rotational body having an axis of cylindrical symmetry.

3. The apparatus of claim 2, wherein the vortex reducing device has an axis of cylindrical symmetry.

4. The apparatus of claim 3, wherein the vortex reducing device is deployed such that the axis of cylindrical symmetry of the vortex reducing device is coaxial with the axis of symmetry of the vortex concentrator.

5. The apparatus of claim 1, wherein the vortex reducing device comprises a hub, a duct, and at least one pair of ribs, and wherein one of the pair of ribs is coupled to the hub and one of the pair of ribs is coupled to the duct.

6. The apparatus of claim 5, wherein each of the ribs has a length that is selected to rectify fluid flowing past the ribs.

7. The apparatus of claim 5, wherein the at least one pair of ribs comprises at least one pair of triangular ribs.

8. The apparatus of claim 5, wherein the at least one pair of ribs comprises eight pairs of triangular ribs.

9. The apparatus of claim 5, wherein a diameter of the duct is selected so that a selected tip vortex velocity is within the duct.

10. The apparatus of claim 5, wherein one of the pair of ribs is deployed on the hub and one of the pair of ribs is deployed on the duct such that each pair of ribs does not substantially shadow another pair of ribs as fluid flows past the pair of ribs, and wherein each rib does not substantially shadow another rib as fluid flows past the pair of ribs.

11. The apparatus of claim 5, wherein at least one of the ribs, the hub, and the duct comprise carbon fiber.

12. The apparatus of claim 1, wherein the vortex reducing device comprises a propeller.

13. The apparatus of claim 12, wherein one or more eigenfrequencies of the propeller are substantially outside a seismic band being sensed by the sensors.

14. The apparatus of claim 12, further comprising a generator, and wherein the propeller is rotationally coupled to the generator so that rotation of the propeller drives the generator.

15. The apparatus of claim 14, wherein the generator is electrically coupled to a battery.

16. The apparatus of claim 14, wherein the generator is electrically coupled to the hydrofoil, and wherein the generator is configured to provide electric power to a control system of the hydrofoil.

17. A method, comprising:
towing a marine seismic streamer and a hydrofoil operatively connected to the streamer;
concentrating at least one vortex proximate at least one tip of the hydrofoil; and
reducing a rotational velocity of the at least one concentrated vortex by passing the concentrated vortex through a vortex reducing device thereby reducing noise in the streamer, the vortex reducing device selected from
a) a device comprising a hub, a duct and at least one pair of ribs, wherein one of the pair of ribs is coupled to the hub and one of the pair of ribs is coupled to the duct; and
b) a propeller.

18. The method of claim 17, wherein concentrating the at least one vortex proximate the tip of the hydrofoil comprises providing at least one rotational body proximate the tip of the hydrofoil.

19. The method of claim 17, wherein reducing the rotational velocity of the at least one concentrated vortex comprises providing at least one vortex reducing device substantially in a wake of the at least one rotational body.

20. The method of claim 19, wherein providing the at least one vortex reducing device substantially in the wake of the at least one rotational body comprises providing at least one pair of ribs substantially in the wake of the at least one rotational body.

21. The method of claim 20, wherein providing the at least one pair of ribs substantially in the wake of the at least one rotational body comprises providing at least one pair of triangular ribs substantially in the wake of the at least one rotational body.

22. The method of claim 20, wherein providing the at least one pair of ribs substantially in the wake of the at least one rotational body comprises providing the at least one pair of ribs such that each pair of ribs does not substantially shadow another pair of ribs as fluid flows past the pair of ribs, and such that each rib does not substantially shadow another rib as fluid flows past the pair of ribs.

23. The method of claim 16, further comprising generating electrical power using the at least one tip vortex.

24. The method of claim 23, further comprising providing the generated electrical power to at least one of a battery and the hydrofoil.

25. An apparatus, comprising:
a marine seismic streamer and a hydrofoil operatively connected to the streamer;
a vortex concentrator deployed proximate a tip of the hydrofoil;
a hub deployed proximate a trailing end of the vortex concentrator;
a duct deployed coaxially with the hub; and
at least one pair of ribs, wherein one of the pair of ribs is coupled to the hub and one of the pair of ribs is coupled to the duct.

26. The apparatus of claim 25, where in the at least one pair of ribs comprises a pair of triangular ribs.

27. The apparatus of claim 25, wherein a diameter of the duct is selected so that a selected tip vortex velocity is within the duct.

28. The method of claim 25, wherein at least one of the ribs, the hub, and the duct comprise carbon fiber.

29. An apparatus, comprising:
a marine seismic streamer and a hydrofoil operatively connected to the streamer;
a vortex concentrator deployed proximate a tip of hydrofoil; and
a propeller deployed substantially in the wake of the vortex concentrator such that the propeller acts to reduce a rotational velocity of vortices proximate the tip of the hydrofoil.

30. The apparatus of claim 29, wherein one or more eigenfrequencies of the propeller are substantially outside a seismic band being sensed by sensors in the marine seismic steamer.

31. The apparatus of claim 29, further comprising a generator, and wherein the propeller is rotationally coupled to the generator so that rotation of the propeller drives the generator.

32. The apparatus of claim 31, wherein the generator is electrically coupled to the hydrofoil, and wherein the generator is configured to provide electric power to a control system of the hydrofoil.

33. The apparatus of claim 29, wherein the propeller is designed based upon an expected inflow angle of a fluid flow that includes a linear portion and a highly rotational portion.

* * * * *